(12) United States Patent
Beneker et al.

(10) Patent No.: US 7,902,781 B2
(45) Date of Patent: Mar. 8, 2011

(54) ADJUSTMENT DEVICE FOR A MOTOR VEHICLE SEAT

(75) Inventors: Wilfried Beneker, Leichlingen (DE); Burckhard Becker, Solingen (DE); Michael Reimann, Dusseldorf (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 383 days.

(21) Appl. No.: 12/239,212

(22) Filed: Sep. 26, 2008

(65) Prior Publication Data
US 2009/0115359 A1    May 7, 2009

(30) Foreign Application Priority Data

Sep. 27, 2007 (DE) .......................... 10 2007 046 671

(51) Int. Cl.
*H02H 7/08* (2006.01)

(52) U.S. Cl. ...................... 318/453; 318/400.3; 280/735; 280/734; 280/806; 701/45; 701/70; 701/36; 180/282

(58) Field of Classification Search .................. 701/45, 701/70, 36; 280/735, 734, 806; 318/453, 318/400.3; 180/282, 271
See application file for complete search history.

(56) References Cited

U.S. PATENT DOCUMENTS

| | | | | |
|---|---|---|---|---|
| 4,222,030 A * | 9/1980 | Yasui et al. | ................... | 180/274 |
| 4,384,734 A * | 5/1983 | Yasui | ............................. | 280/735 |
| 4,851,705 A * | 7/1989 | Musser et al. | ................ | 307/10.1 |
| 5,068,640 A * | 11/1991 | Burger et al. | ................. | 340/438 |
| 5,204,547 A * | 4/1993 | Schumacher et al. | ........ | 307/10.1 |
| 5,324,071 A * | 6/1994 | Gotomyo et al. | ........... | 280/730.1 |
| 5,466,001 A * | 11/1995 | Gotomyo et al. | ........... | 280/730.1 |
| 5,522,617 A * | 6/1996 | Swart | ............................. | 280/735 |
| 5,718,452 A * | 2/1998 | Vogt | ............................. | 280/735 |
| 6,145,875 A * | 11/2000 | Aoki | ............................. | 280/735 |
| 6,225,707 B1* | 5/2001 | Hermann | ...................... | 307/10.1 |
| 6,279,479 B1* | 8/2001 | Hermann | ...................... | 102/218 |
| 6,448,784 B1* | 9/2002 | Belau et al. | ..................... | 324/548 |

* cited by examiner

*Primary Examiner* — Rita Leykin
(74) *Attorney, Agent, or Firm* — Cantor Colburn LLP

(57) ABSTRACT

An adjustment device for a motor vehicle seat that includes an electric motor, a gear connected to the electric motor, a mechanical adjustment unit connected to the gear and a control circuit, at least one sensor being associated with the control circuit for detecting a critical situation of the motor vehicle and the control circuit providing an operating voltage for the electric motor, characterized in that the control circuit provides as an alternative, in addition to the normal operating voltage, an overvoltage for supplying the electric motor, that the normal operating voltage applies in a normal driving condition of the motor vehicle in which the sensor does not deliver any signal, that the overvoltage applies at the electric motor in a driving condition after the sensor has delivered a signal indicating that the driving condition is no longer normal and that the overvoltage is at least 150% of the value of the normal operating voltage, more specifically at least 200% of the value of the normal operating voltage.

15 Claims, 2 Drawing Sheets

ADJUSTMENT DEVICE FOR A MOTOR VEHICLE SEAT

TECHNICAL FIELD OF THE INVENTION

The invention relates to an adjustment device for a motor vehicle seat comprising an electric motor, a gear connected to the electric motor, a mechanical adjustment unit connected to the gear and one control circuit, at least one sensor being associated with the control circuit for detecting a critical situation of the motor vehicle. Said control circuit provides an operating voltage for the electric motor.

BRIEF DISCUSSION OF RELATED ART

Such type adjustment devices are prior art. Beside the adjustment device equipped with an electric motor, there also exist manual adjustment devices, to which however the invention is not directed. The electric motor is controlled through the control circuit in a known way. The control circuit concurrently has a source of operating voltage or at least a terminal to a source of operating voltage. The electric motor is switched on and off through an operating switch that is associated with the control circuit and is operated by the passenger. The movement of adjustment is made as a result thereof.

Examples for such type adjustment devices are adjustment devices for a head restraint and in particular for an adjustment of the head restraint substantially in the x direction, meaning toward the head of a passenger and back, or in the z direction, meaning a height adjustment of the head restraint, then adjustment devices for the back rest, in particular an incline adjustment device, also longitudinal adjustment devices, seat incline adjustment devices and seat depth adjustment devices.

The invention relates in particular to such adjustment devices that are to occupy a position avoiding or at least reducing damage to persons when the vehicle suffers an accident. This applies for example for the adjustment of the position of the head restraint which, in the event of an accident, should have the right position with respect to the passenger's head. There are also differences between a frontal crash and a rear impact collision; through the control circuit it can be detected which type of crash the vehicle has encountered so that, depending on the type of the accident, the parts to be adjusted, of the head restraint for example, can be brought into a different position.

The adjustment device is not limited to motor vehicle seats, it also relates to such parts of the motor vehicle that are associated with the passenger and that influence the welfare of the passenger in the event of an accident, such as the adjustment of a steering wheel that can be pulled toward the dashboard in the event of an accident.

Many devices are known from prior art which use additional actuators which are only utilized in the event of an accident and are of no use in normal operation. The reader is referred, by way of example only, to the documents U.S. Pat. No. 6,659,548 B1, US 2006/0260424 A1, DE 10 2005 059 693 A1, DE 10 2005 050 971 A1 and DE 10 2005 050 223 A1. Insofar, pyrotechnic charges, pre-biased springs and the like are utilized. Each of these parts however are added and need a certain expense. They in particular suffer from the disadvantage that they cannot be simply placed back after an accident. Often, they lead to permanent changes in the adjustment device so that the entire adjustment device often needs to be replaced.

BRIEF SUMMARY OF THE INVENTION

This is where the invention comes in; it pursues the purpose of devising the adjustment device such that, in the event of lighter accidents in which the crash sensors just start to respond, it remains ready for use so that there is no need for replacing for example an entire motor vehicle seat or for taking complex provisions to replace actuators as they are often being utilized. Its seeks to utilize the short period of time between the detection of an accident event and of the actual effect of the accident, meaning of the relative movement of the passenger with respect to a vehicle seat and the deformation of the vehicle seat, to bring the adjustment device into a position particularly suited for the accident. Such a position is understood to be a position in which a passenger is supported in the best possible way, for example for his head to be capable of only making slight relative movements with respect to the head restraint. In the really critical moment, the adjustment device should already be adjusted in a position which is advantageous for receiving mass forces a passenger exerts thereon.

The invention further develops the adjustment devices of the type mentioned herein above in such a manner that they are well suited for adjusting the adjustment device to an accident condition; component parts should thereby be used, which can be used further after a minor accident but that, in any case, need not be completely exchanged.

In view of the adjustment device of the type mentioned herein above, this is achieved in that the control circuit provides as an alternative, in addition to the normal operating voltage, an overvoltage for supplying the electric motor, that the normal operating voltage applies in a normal driving condition of the motor vehicle in which the sensor does not deliver any signal, that the overvoltage applies at the electric motor in a driving condition after the sensor has delivered a signal indicating that the driving condition is no longer normal and that the overvoltage is at least 150% of the value of the normal operating voltage, more specifically at least 200% of the value of the normal operating voltage.

On this adjustment device, the electric motor, which is present anyway, is used to achieve, during the short time between the alarm signal and the actual accident motion of a passenger, the best possible adjustment of the adjustment device, a better adjustment than before at any rate. In accordance with the invention, the adjustment speed is considerably increased by the fact that, in the event of an accident, the electric motor is operated at a considerably higher operating voltage than in the normal driving condition, namely at an overvoltage. This overvoltage can be chosen to be very high since it applies at the electric motor and strains it for only a very short time, namely the short period of time that is available to prepare the accident. It is switched off as soon as possible, in particular after a dictated time period of e.g., 1 second. In this 1 second, the excessive overload will not subject the electric motor to thermal overload. However, it leads to a considerable acceleration of the movement of the adjustment device and thus to a much faster adjustment operation.

The invention is particularly suited for such adjustment devices that do not have to move so high a mass. Adjustment devices which have to move a high mass are understood to be in particular the longitudinal adjustment device, which must not only displace the vehicle seat as a whole but usually also the weight of a passenger. The adjustment devices of head restraints, by contrast, have to deal with low masses. On the one side, a head restraint is much lighter than a complete vehicle seat, on the other side, it can also be configured to have a relatively light weight. Finally, the electrical actuation of a head restraint needs much less motor power than that of the longitudinal adjustment.

By virtue of the overvoltage, the electric motor rotates at a significantly higher speed than in the normal condition. It is intended to be at least 50%, preferably at least 100%, higher upon detection of an accident situation. If the adjustment device is of a light construction, considerable mass can be saved. Critical masses are in particular the fast rotating masses of the electric motor and of the first reduction gear wheels. These are preferably equipped with a low moment of inertia. Pancake motors are particularly suited as said electric motor since they have a low moment of inertia. Pancake motors are known to be capable of achieving their maximum speed within milliseconds.

The overvoltage is preferably generated from the on-board electrical system of the motor vehicle by increasing the on-board voltage. For this purpose, circuits that have long been known in the art can be utilized to multiply the voltage. If the usual on-board voltage is 12 V, the overvoltage can easily be 48 V. In order for the voltage multiplier not to have to actually provide the entire power the electric motor taps in the event of an accident, it is advantageous to provide for a capacitor of sufficient capacity at the output of the voltage multiplier. This capacitor stores sufficient charge to provide overvoltage with sufficient current intensity during the accident event. The capacitors needed are standard component parts. As a result, the voltage multiplier can be built at low cost.

In a preferred implementation, a quite fast turning electric motor is used as the electric motor, this motor having a significantly higher nominal speed than the presently utilized electric motors. Presently, the electric motors used have a nominal speed of 3,000 to 4,000 rpm. If electric motors are used, which rotate twice as fast, in particular three times to four times as fast, lighter electric motors can be utilized to achieve a weight savings. One needs higher transmission ratios in the gear but the mass needed therefor is negligible since with the reduction gear wheels, which rotate as quite high a speed, the torque is not high so that no high strength is required, which makes it possible to use plastic gear wheels in particular. The midget motors can be brought quite easily in markedly high operating ranges. They have a lower moment of inertia than the usually presently utilized prior art motors.

In particularly preferred developed implementation, electric motor, gear and control circuit are combined into one unit. They are preferably disposed in one common housing. The electric motor can keep its housing and there is provided an additional housing that encloses the electric motor but that also accommodates the gear and the control circuit. The housing of the electric motor can however also be configured so as to additionally accommodate the gear and the control circuit.

BRIEF DESCRIPTION OF THE DRAWINGS

Other features and advantages will become more apparent upon reviewing the appended claims and the following non restrictive description of embodiments of the invention, given by way of example only with reference to the drawing. In the drawing:

DETAILED DESCRIPTION OF THE INVENTION

Figure 1:
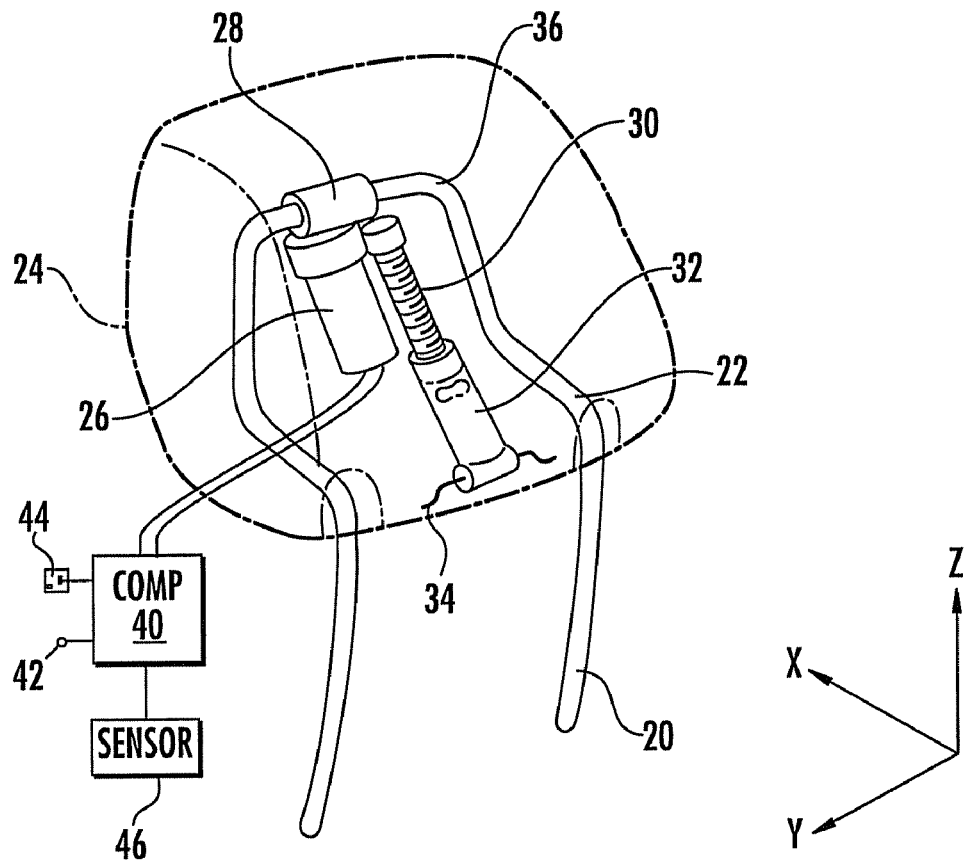
FIG. 1: shows a perspective illustration of a motor-adjustable head restraint with an electric motor, a gear and a control circuit.

FIG. 1 shows a motor-adjustable head restraint. It has two bars 20, each of which forms an inclined region 22. Within this inclined region, a padding 24 is displaced forward in the x direction and at the same time upward in the z direction so that it can be brought in closer proximity to the head (not shown) of a passenger. The padding 24 is supported in a known way through a mechanical supporting frame (not shown). The adjustment device has an electric motor 26 and a gear 28 connected thereto. As the mechanical parts, the adjustment device has a first adjustment part 30 that is configured to be a spindle here, and a second adjustment part 32 that is configured to be a spindle nut in the instant case. When the spindle 30 is screwed into the spindle nut 32, the distance between a lower abutment 34 and an upper crossbeam 36 that is connected to the bars 20 shortens. As a result, the padding 24 is moved in the indicated direction.

The electric motor 26 is connected to a controller 40 through a line 38. The controller 40 is connected to the on-board electrical system 42 of the motor vehicle via a connecting line. Further, an operating switch 44 is associated with the controller 40, the switch allowing the user to actuate the normal adjustment function in normal driving condition. Finally, a sensor 46 is associated with the controller 40. In a known way, it is configured to be a crash sensor 46; a sensor 46 can be used as it is being used for enabling airbags. What is meant here is a sensor 46 that is responsive at certain acceleration, that more specifically also takes a certain acceleration curve into consideration. Other possibilities for the sensor 46 have already been discussed herein above.

Figure 2:
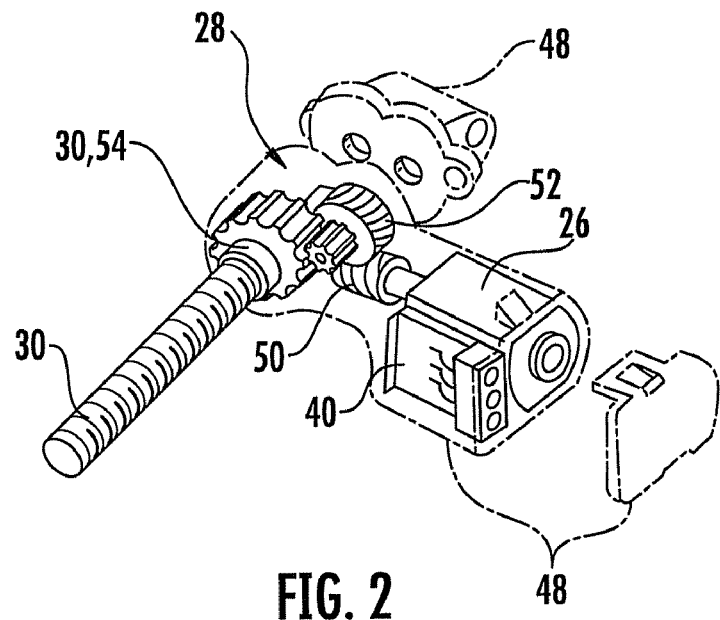
FIG. 2: shows a perspective illustration of the drive part of an adjustment device as it is utilized in similar fashion in FIG. 1 and FIG. 3: shows a schematic diagram of a controller with an electric motor.

As shown in FIG. 2, electric motor 26, gear 28 and also the controller 40 are accommodated in one common housing 48. The gear 28 has a worm 50 that is disposed on the output shaft of the motor and that meshes with a worm gear 52. This worm gear 52 in particular is made from plastic material; other gear wheels can be implemented in the same way. The gear 28 is devised such that the masses to be moved are as low as possible. In the implementation shown in FIG. 2, a spindle nut 54 is provided in the gear 28, the spindle nut rotating relative to the spindle 30; it is driven by the electric motor 26. As a result, the spindle 30 remains non rotatable. This also contributes in keeping low the masses to be moved.

The electric motor 26 has its own motor housing 56. It is possible to combine the motor housing 56 at least partially with the housing 48. The controller 40 is devised for the electric motor 26 only and must not supply other electric motors as this is the case in prior art. As a result, it can be configured to be quite small. It can be triggered through a bus (not shown). In the exemplary embodiment shown, the controller 40 is directly connected to the motor housing 56. As a result, its surface can be used for cooling component parts.

Figure 3:
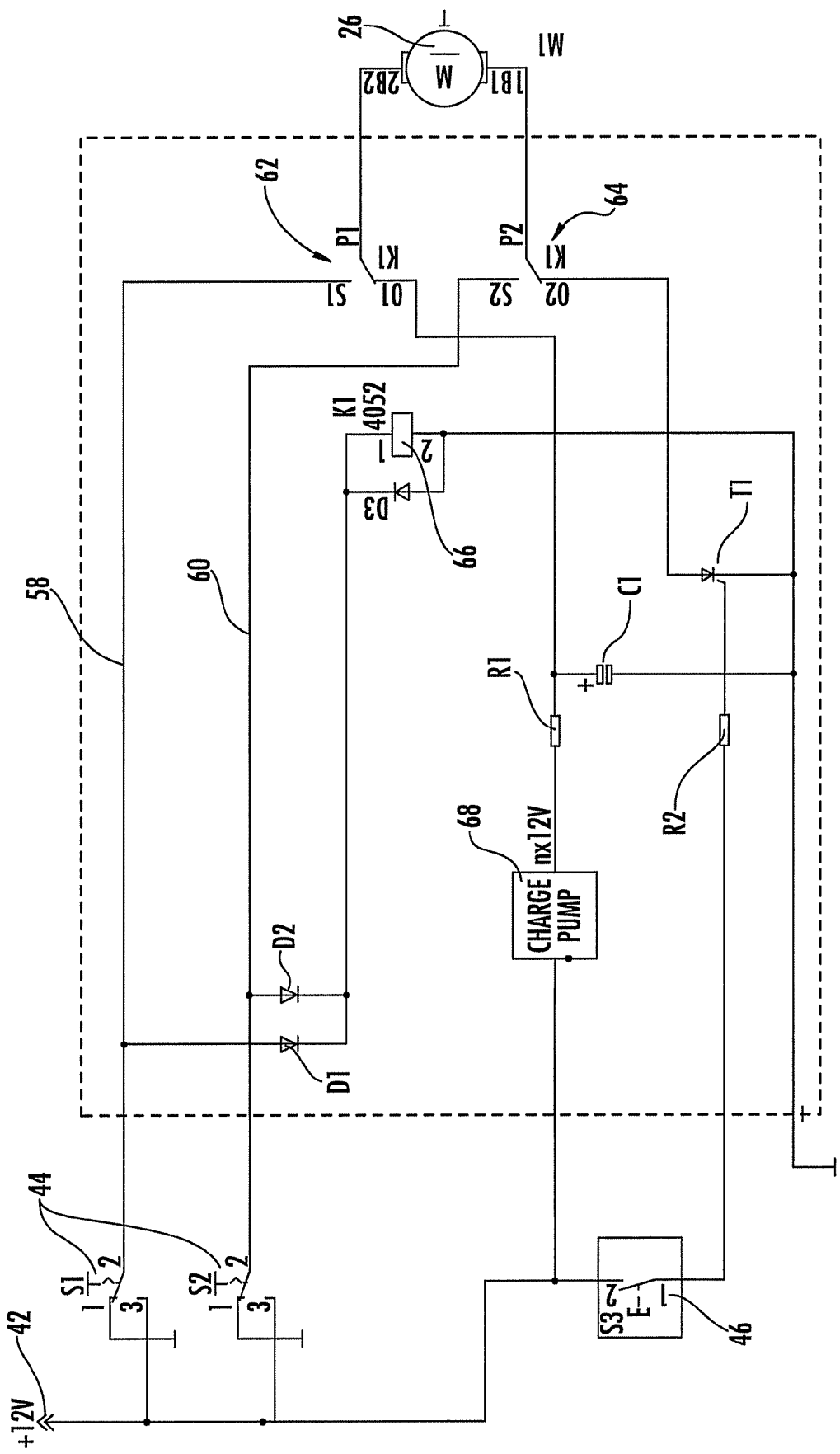

The electric diagram of the controller can be seen in FIG. 3. At 42, the controller 40 is connected to the on-board electrical system. Through two operating switches 44, which are usually switched off, the voltage of the on-board electrical system, meaning in particular 12 V, can be applied, according to choice, either to the upper line 58 or to the lower line 60, with the other line 60 or 58 remaining grounded. If the contacts 62, 64 of the relay 66 are in the upper position, a normal voltage supply of the electric motor 26 is possible. In FIG. 3, there is shown the position in which both the upper contact 62 and the lower contact 64 is not connected to the lines 58, 60. This condition is the condition of rest of the relay 66; in this condition, no current flows through the relay coil. In order to make an adjustment in a normal operating condition, one of the two operating switches 44 are actuated for one of the two lines 58, 60 to be at 12 volt. Then, the coil of relay 66 receives a voltage through the diode D1 or the diode D2, the coil is excited and the two contacts 62, 64 move upward from the position of rest; they are then in contact with the two lines 58, 60.

Herein after, the condition after an accident will be described: the voltage of the on-board electrical system of e.g., 12 V applies to a circuit 68 for multiplying the voltage; it permanently produces an output voltage of n×12V. Through a protective resistance R1, this voltage applies to the charging capacitor C1 and charges it to n×12 V. The capacitor C1 has a value of some Farad, e.g., 2 F. As a result, n×12 V are permanently applied to the upper contact 62 and, as a result thereof, to the electric motor 26. The electric motor however is not permanently connected to ground. In the ground line, there is inserted a fast switch T1, more specifically a thyristor or a switching transistor that is controlled by the sensor 46. It is faster than relay 66. If the sensor 46 is responsive, if, accordingly, the switch shown in the sensor 46 is closed, the switch T1 switches through and connects the lower pole of the electric motor 26 to ground. As a result, the voltage of n×12V, e.g., 48 V, applies to the electric motor 26; the electric motor 26 is operated in the strong overload mode of operation and actuates very fast the gear 28 and the parts connected downstream thereof.

The charge in the capacitor C1 is calculated such that the overvoltage only applies for a short period of time, such as 1 s, 0.5 s or even only 100 milliseconds. Then, the charge stored in the capacitor C1 has almost run down, the capacitor is discharged to a large extent and the electric motor 26 is reved up.

Nominal voltage and nominal speed respectively refer to the value indicated by the manufacturer of the motor for normal operation of the electric motor.

The invention claimed is:

1. An adjustment device for a motor vehicle seat comprising an electric motor, a gear connected to said electric motor, a mechanical adjustment unit connected to said gear and a control circuit, at least one sensor being associated with said control circuit for detecting a critical situation of said motor vehicle and said control circuit providing an operating voltage for said electric motor, wherein said control circuit provides in addition to said normal operating voltage, an overvoltage for supplying said electric motor, said normal operating voltage is applied in a normal driving condition of said motor vehicle in which said sensor does not deliver any signal and said overvoltage is applied at said electric motor in a driving condition after said sensor has delivered a signal indicating that a critical situation of said motor vehicle is present, said overvoltage being at least 150% of said value of said normal operating voltage.

2. The adjustment device as set forth in claim 1, wherein said sensor is a crash sensor that is responsive to decelerations of said motor vehicle as they occur when said motor vehicle is subjected to deformations due to an accident.

3. The adjustment device as set forth in claim 1, wherein said sensor is at least one of a distance meter that operates with radar or with ultrasound, an ABS system that senses a rolling condition of all wheels of said motor vehicle and a system for detecting a ground track of said motor vehicle.

4. The adjustment device as set forth in claim 1, wherein said electric motor and/or said gear comprise a lowest possible moment of inertia.

5. The adjustment device as set forth in claim 1, wherein said control circuit comprises an operating switch and a switching device, said switching device alternatively applying to said electric motor either said normal operating voltage, controlled through said operating switch, or said overvoltage.

6. The adjustment device as set forth in claim 1, wherein said control circuit comprises a circuit for increasing said voltage and a capacitor is provided, that is always charged with said overvoltage.

7. The adjustment device as set forth in claim 6, wherein said circuit for increasing said voltage is devised for a power that is smaller than 20% of a power needed for operating said electric motor at said overvoltage.

8. The adjustment device as set forth in claim 6, wherein said capacitor is devised such that a charge stored therein is only sufficient for operating said electric motor at said overvoltage for only a maximum duration of 1 s.

9. The adjustment device as set forth in claim 6, wherein said capacitor is devised such that a charge stored therein is only sufficient for operating said electric motor at said overvoltage for only a maximum duration of 0.1 s.

10. The adjustment device as set forth in claim 1, wherein said adjustment device is an adjustment device for a head restraint.

11. The adjustment device as set forth in claim 1, wherein said electric motor, said gear and said control circuit are accommodated in one common housing.

12. The adjustment device as set forth in claim 1, wherein said overvoltage is at least 200% of said value of said normal operating voltage.

13. The adjustment device as set forth in claim 1, wherein said electric motor is a pancake motor.

14. The adjustment device as set forth in claim 1, wherein gear wheels of said gear are one of plastic gear wheels and light metal gear wheels.

15. The adjustment device as set forth in claim 1, wherein said control circuit comprises a circuit for increasing said voltage and a capacitor is provided, that is always charged with said overvoltage, said capacitor being connected downstream of said component part.

* * * * *